United States Patent
Postberg et al.

(10) Patent No.: US 9,506,787 B2
(45) Date of Patent: Nov. 29, 2016

(54) DIFFERENTIAL PRESSURE MEASURING DEVICE HAVING A SHUT-OFF BODY WITH A CONSTRICTION IN THE FLOW CHANNEL

(71) Applicant: POSTBERG + CO. DRUCKLUFT-CONTROLLING GMBH, Kassel (DE)

(72) Inventors: Hans-Jürgen Postberg, Bad Nauheim (DE); Peter Otto, Kassel (DE)

(73) Assignee: POSTBERG + CO. DRUCKLUFT-CONTROLLING GMBH, Kassel (DE)

( * ) Notice: Subject to any disclaimer, the term of this patent is extended or adjusted under 35 U.S.C. 154(b) by 34 days.

(21) Appl. No.: 14/401,033

(22) PCT Filed: Jun. 3, 2013

(86) PCT No.: PCT/EP2013/061415
§ 371 (c)(1),
(2) Date: Nov. 13, 2014

(87) PCT Pub. No.: WO2013/182532
PCT Pub. Date: Dec. 12, 2013

(65) Prior Publication Data
US 2015/0143921 A1 May 28, 2015

(30) Foreign Application Priority Data

Jun. 4, 2012 (DE) .................... 20 2012 102 034 U

(51) Int. Cl.
*G01F 1/40* (2006.01)
*G01F 1/42* (2006.01)
*G01F 15/00* (2006.01)

(52) U.S. Cl.
CPC . *G01F 1/42* (2013.01); *G01F 1/40* (2013.01); *G01F 15/005* (2013.01)

(58) Field of Classification Search
None
See application file for complete search history.

(56) References Cited

U.S. PATENT DOCUMENTS 3,244,002 A * 4/1966 Prono ........................ G01F 1/00
251/174
3,410,138 A 11/1968 Lynch
(Continued)

FOREIGN PATENT DOCUMENTS

WO WO-2012067604 A1 5/2012

*Primary Examiner* — Harshad R Patel
(74) *Attorney, Agent, or Firm* — Harness, Dickey & Pierce, P.L.C.

(57) ABSTRACT

The invention relates to a device for measuring the differential pressure in a flowing fluid. The invention has a housing having two coaxial openings and an inner space. The inner space can be accessed by at least one of the openings. A measuring nozzle is arranged in the housing and has a flow channel with a cross-sectional constriction, and a differential pressure sensor comprising two measuring inlets for sensing a difference between pressures at the measuring inlets. A first one of the measuring inlets is in connection with the flow channel. A second one of the measuring inlets is in connection outside of the measuring nozzle with the inner space, and with a shut-off body. The shut-off body includes the measuring nozzle and is rotatably mounted in the housing about a rotation axis. The shut-off body, in a first rotational angle position, connects the flow channel to the two openings, and in a second rotational angle position blocks a flow between the two openings.

11 Claims, 7 Drawing Sheets

(56) References Cited

U.S. PATENT DOCUMENTS

| | | | | |
|---|---|---|---|---|
| 3,736,797 A * | 6/1973 | Brown | G01F 1/44 | 73/861.64 |
| 3,774,645 A * | 11/1973 | Pompa | G01F 1/44 | 138/44 |
| 3,859,853 A * | 1/1975 | Khuzaie | G01F 1/44 | 138/44 |
| 5,533,549 A * | 7/1996 | Sherman | F16K 27/067 | 137/556.6 |
| 6,216,727 B1 * | 4/2001 | Genova | F17D 5/02 | 137/460 |
| 6,349,603 B1 * | 2/2002 | Spiess | G01F 5/005 | 73/323 |
| 2003/0205095 A1 * | 11/2003 | Cipolla | G01F 1/40 | 73/861.55 |
| 2004/0118219 A1 * | 6/2004 | Pollard | F16K 5/0605 | 73/861.52 |
| 2009/0326839 A1 * | 12/2009 | Rogers | G01F 1/3209 | 702/47 |
| 2014/0137663 A1 * | 5/2014 | Evans | G01F 1/40 | 73/861.61 |

\* cited by examiner

DIFFERENTIAL PRESSURE MEASURING DEVICE HAVING A SHUT-OFF BODY WITH A CONSTRICTION IN THE FLOW CHANNEL

FIELD

The invention relates to a device for measuring differential pressure in a flowing fluid, and more particularly to a device having a housing having two coaxial openings and an interior, said housing being accessible through the or at least one of the openings, a measuring nozzle arranged in the housing and having a flow channel having a cross-sectional constriction, a differential pressure sensor having two measuring inlets, by means of which a difference between pressures at the measuring inlets is able to be measured, wherein a first of the measuring inlets is connected to the flow channel and a second of the measuring inlets is connected to the interior, outside the measuring nozzle.

BACKGROUND

A device for measuring pressure differential is present, for example, in a compressed air system and can be used for measuring flow. As several shut-off and measuring nozzles must be installed, as a rule, in a compressed air system, the desire exists to be able to keep the installation expense as low as possible.

Based on this, the object of the invention is to reduce the installation expense for compressed air systems having at least one shut-off valve and at least one differential pressure sensor.

SUMMARY

This object is achieved according to the invention by a device as set forth in the claims hereof.

A device according to one embodiment of the invention for measuring differential pressure in a flowing fluid comprises a housing having two coaxial openings and an interior. The housing is accessible through the or at least one of the openings, a measuring nozzle arranged in the housing and having a flow channel having a cross-sectional constriction, a differential pressure sensor having two measuring inlets, by means of which a difference between pressures at the measuring inlets is able to be measured, wherein a first of the measuring inlets is connected to the flow channel and a second of the measuring inlets is connected to the interior, outside the measuring nozzle, and a shut-off body comprising the measuring nozzle and mounted in the housing to rotate around a rotational axis. The shut-off body connects the flow channel to the two openings in a first rotational angle position and blocks a flow between the two openings in a second rotational angle position.

The device according to the invention comprises or forms a shut-off valve, which, in addition to its shut-off function, enables a differential pressure measurement in the flowing fluid. The fluid is, in particular, compressed air. The installation expense can thus be reduced with respect to a separate installation of shut-off valve and differential pressure sensor in a compressed air system.

The second rotational angle position is rotated around the rotational axis with respect to the first rotational angle position, in particular by 90° or by approximately 90°. The axis of the coaxial openings preferably forms a longitudinal axis of the housing. The direction of the axis of the coaxial openings is referred to, in particular, as the axial direction.

A radial direction is preferably understood as a or any direction which runs perpendicularly to the axis of the coaxial openings. Preferably, the shut-off body is arranged between the coaxial openings, in particular in the axial direction. The interior is provided, for example, between the shut-off body and one of the coaxial openings. Preferably, the rotational axis runs perpendicularly or substantially perpendicularly to the axis of the coaxial openings.

The measuring nozzle is formed, in particular, by the shut-off body. Preferably, the flow channel extends through the shut-off body, perpendicularly to the rotational axis. Advantageously, the cross-sectional constriction in the flow channel is a local cross-sectional constriction. By this, it is to be understood, in particular, that the cross-section of the flow channel is larger at its ends than in the region of the cross-sectional constriction lying between these ends. Advantageously, the cross-section of the interior is larger than the cross-section of the flow channel in the region of the cross-sectional restriction. Preferably, the measuring nozzle forms a choke. In particular, the measuring nozzle is a Venturi nozzle. Preferably, a flow measurement, preferably a Venturi flow measurement, is able to be implemented by means of the device according to the invention.

Preferably, a flow passage comprising the openings and the interior runs through the housing, in which, in particular, the shut-off body is arranged. Preferably, the flow passage extends in the axial direction. In particular, the flow passage extends between the openings. The shut-off body preferably enables a flow of the or a fluid through the flow passage in the first rotational angle position. In particular, the flow channel is connected in the flow passage in the first rotational angle position and/or forms a part of the same. Advantageously, the flow channel runs in the axial direction in the first rotational angle position. The shut-off body preferably blocks a flow of the fluid through the flow passage in the second rotational angle position. The blocking of the flow passage occurs, in particular, by means of the wall of the shut-off body. Preferably, the flow channel runs transversely to the flow passage in the second rotational angle position.

In the first rotational angle position, the flow passage preferably has its smallest cross-section in the region of the cross-sectional constriction. Advantageously, the cross-section of the flow passage is larger outside the cross-sectional constriction than in the region of the cross-sectional constriction, in particular in the first rotational angle position.

The shut-off body preferably has a bearing surface, which abuts onto one or more, preferably two, counter-bearing surfaces, to be able to slide, which are provided, in particular, in the housing. The shut-off body is thus mounted in the housing on the counter-bearing surface(s) to rotate around the rotational axis by means of its bearing surface. Preferably, the shut-off body comprises or forms a ball, through which the flow channel extends. Preferably, the centre point of this ball lies on the axis of the coaxial openings. In particular, the bearing surface forms a ball surface or a part of a ball surface. Such a shut-off body is also referred to as a shut-off ball. The device according to the invention thus comprises or forms a ball valve. Preferably, the one or more counter bearing surfaces also each form a ball surface or a part of a ball surface. Preferably, the one or more counter bearing surfaces lie on a ball surface on which, in particular, the bearing surface also lies or at least approximately lies. The shut-off body preferably consists of metal, in particular of steel.

According to one embodiment of the invention, a pressure tapping hole discharging into the flow channel is provided in the wall of the shut-off body. The first measuring inlet can be directly or indirectly connected to this pressure tapping hole. Preferably, the pressure tapping hole is connected to a clearance provided between the shut-off body and the housing, at least in the first rotational angle position, to which clearance the first measuring inlet is connected. The first measuring inlet is thus indirectly connected to the pressure tapping hole discharging into the flow channel, in particular by interposing the clearance. Thus, the rotatability of the shut-off body, and thus also the measuring nozzle, can be considered in a simple manner, without having to insert a flexible connection line or similar. The clearance is formed, in particular, to be rotary.

According to one development of the invention, the shut-off body sits between two slide rings arranged in the housing. In particular, the shut-off body abuts onto these slide rings to be able to slide. The shut-off body is thus mounted in the housing to be able to rotate around the rotational axis by means of the slide rings. In this sense, the slide rings form a two-part bearing seat for the shut-off body. Preferably, the slide rings consist of plastic or of metal. The clearance is preferably provided between the slide rings. The counter-bearing surfaces are provided, in particular, on the slide rings.

According to one embodiment of the invention, the housing has a first housing part receiving the shut-off body and a second housing part, which is, in particular, firmly connected to the first housing part and is arranged advantageously at least partially in the second housing part. Alternatively, for example, the first housing part can also be arranged at least partially in the second housing part. The interior preferably extends into the first and/or into the second housing part and/or through this or these and/or is provided in this or these. Advantageously, the second housing part secures the shut-off body in the housing, in particular in the first housing part. Preferably, the shut-off body is secured in the first housing part in the axial direction between a system provided in the first housing part and the second housing part. This system can, for example, be provided in the first housing part in the form of a radial inner shoulder.

The second housing part can be formed as a ring or circlip inserted into the first housing part. Advantageously, the second housing part is screwed into the first housing part. In particular, the second housing part extends from the first housing part, preferably in the axial direction. Preferably, the second housing part forms a connecting piece or a flange, to which a fluid line is able to be connected. Preferably, the second housing part comprises one of the coaxial openings, through which, in particular, the interior is accessible. The other of the coaxial openings is, for example, provided in the first housing part. The second housing part is preferably formed as a hollow body, the hollow space of which is, in particular, continuous in the axial direction and preferably comprises or forms the interior. Advantageously, the flow passage runs through the hollow space of the second housing part. Furthermore, the first housing part is preferably formed as a hollow body, the hollow space of which is, in particular, continuous in the axial direction. In particular, the flow passage runs through the hollow space of the first housing part. Advantageously, the hollow space of the first housing part merges into the hollow space of the second housing part. Preferably, the first housing part is formed cylindrically or substantially cylindrically. In particular, the shut-off body is arranged in the hollow space of the first housing part. Preferably, the second housing part is arranged at least partially in the hollow space of the first housing part.

Preferably, the slide rings are also arranged in the hollow space of the first housing part.

According to one development of the invention, a third housing part is provided which is, in particular, firmly connected to the first housing part and, advantageously, is arranged at least partially in the first housing part. Alternatively, for example, the first housing part can also be arranged at least partially in the third housing part. The system provided in the first housing part is preferably formed by the third housing part. The third housing part can be formed as a ring or circlip inserted into the first housing part. Advantageously, the third housing part is screwed into the first housing part. In particular, the third housing part extends from the first housing part, preferably in the axial direction. Preferably, the third housing part forms a connection piece or a flange, to which a fluid line is able to be connected. The third housing part is preferably formed as a hollow body, the hollow space of which is, in particular, continuous in the axial direction. Preferably, the flow passage runs through the hollow space of the third housing part. Advantageously, the hollow space of the first housing part merges into the hollow space of the third housing part. Preferably, the third housing part is arranged at least partially in the hollow space of the first housing part. In particular, the third housing part comprises the other of the coaxial openings.

The second and the third housing parts are preferably arranged coaxially and preferably are at a distance to each other in the axial direction. The second and the third housing parts are arranged, in particular, on different sides of the first housing part in the axial direction, and preferably screwed into this. Preferably, the second and the third housing parts extend from the first housing part on different sides in the axial direction. The clearance is preferably provided between the second housing part and the system and/or the third housing part. In particular, the second and the third housing parts each comprise one of the openings. Advantageously, a first of the slide rings abuts axially onto the second housing part and a second of the slide rings abuts axially onto the system and/or onto the third housing part. In particular, the flow passage runs through the first housing part and/or the second housing part and/or the third housing part.

The housing preferably consists of metal, in particular of steel. Preferably, the first housing part and/or the second housing part and/or the third housing part each consist of metal, in particular of steel.

According to one development of the invention, a pressure tapping hole discharging into the interior is provided in the wall of the first housing part or the wall of the second housing part. The pressure tapping hole being connected to an annular space provided between the first housing part and the second housing part, to which the second measuring inlet is connected. As the connection between the interior and the second measuring inlet occurs by interposing the annular space, a simple assembly of the second housing part is possible. This is because it must not be orientated in a determined rotational angle position relative to the first housing part in order to ensure a connection between the interior and the second measuring inlet. The annular space is preferably formed by an annular groove introduced into the second housing part. Alternatively or additionally, the annular space can, however, also be formed by an annular groove introduced into the first housing part.

According to one embodiment of the invention, a sensor receiving hole discharging into the flow channel is provided in the wall of the shut-off body, through which another sensor extends in the flow channel. Thus it is possible to implement another measurement in the fluid in addition to the differential pressure measurement. The sensor receiving hole preferably extends along the rotational axis. Thus it is possible to rotate the shut-off body without having to remove the other sensor.

The other sensor can be formed, for example, as a pressure sensor and/or as a temperature sensor and/or as a flow sensor. By means of the other sensor, in particular at least one physical property of the fluid is able to be measured, such as, for example, the pressure and/or the temperature and/or the volume flow and/or the mass flow. Preferably, the other sensor forms a thermal or calorimetric flow sensor. This has the advantage that both a flow measurement based on a differential pressure measurement and a flow measurement based on a thermal or calorimetric measurement is able to be implemented by means of the device. As the highest accuracies of both flow measurements lie in different flow speed ranges of the fluid, the device according to the invention enables a relatively exact flow measurement over a relatively large range of flow speeds. Furthermore, it is possible to verify a flow measurement implemented by means of the thermal or calorimetric flow sensor using a flow measurement implemented by means of the differential pressure sensor. The two measurements are implemented preferably simultaneously or successively. Furthermore it is possible to verify a flow measurement implemented by means of the differential pressure sensor using a flow measurement implemented by means of the thermal or calorimetric flow sensor. These two measurements are also implemented preferably simultaneously or successively. Due to the integration of the other sensor into the device according to the invention, the installation expense for a compressed air system can be further reduced.

According to one development of the invention, at least one additional sensor is provided on or in the housing. The sensor is formed, for example, as a pressure sensor and/or as a temperature sensor. In particular, at least one physical property of the fluid is able to be measured by means of the additional sensor, such as, for example, the pressure and/or the temperature.

Preferably, an actuating device is provided, by means of which the shut-off body is able to rotate around the rotational axis. The actuating device comprises, in particular, a mechanical actuating element connected to the shut-off body, which preferably extends from the housing through an actuating recess provided to the housing. Preferably, the actuating recess is provided in the first housing part. Advantageously, the actuating element is connected to the shut-off body to be torsionally rigid with regard to the rotational axis. Preferably, the actuating device comprises a drive, by means of which the shut-off body is, able to be rotated around the rotational axis and/or the actuating element is able to be actuated for the rotation of the shut-off body. The drive is coupled, in particular, to the actuating element. For example, the drive is formed as an electric, as a hydraulic or as a pneumatic drive. In particular, the drive comprises a motor having a motor shaft, wherein the actuating element is preferably coupled mechanically to the shaft or is formed by this.

As a rule, for flow measurements it is required to provide a so-called inlet pipe, such that if possible no or few eddies occur at the measuring location, which can impair the accuracy of the flow measurement. Such inlet pipes are, as a rule, very long, such that the flow measurement requires a lot of space. In practice, this space is, however, not always available such that the desire exists to be able to shorten the inlet pipe.

According to one development of the invention, a flow straightener is connected to one of the coaxial openings, wherein the second measuring inlet is connected to the interior, preferably between this opening or the flow straightener and the shut-off body and/or the measuring nozzle. The flow straightener in particular smooths the flow of the fluid. Preferably, the flow straightener is connected to this opening by interposing a fluid line. This fluid line preferably forms an inlet pipe which can be allocated to the flow straightener. This inlet pipe can be formed to be clearly shorter than an inlet pipe without a flow straightener.

According to one development, the flow straightener is arranged in a flow straightener housing, on which two test connections are provided, to which a flow straightener differential pressure sensor is able to be connected or is connected. The test connections each form a connection to a continuous hollow space provided in the flow straightener housing, in which hollow space the flow straightener is arranged. In particular, the test connections on different sides of the flow straightener discharge into the hollow space. Due to the flow straightener differential pressure sensor, the difference of pressures of the flowing fluid is able to be measured in front of and behind the flow straightener, such that a contamination of the flow straightener is able to be recorded due to the measured pressure difference.

According to one embodiment, the flow straightener comprises a band which is formed in an undulating manner in the direction of its longitudinal extension and is wound into a spiral. Preferably, the band is provided alternately with elevations and depressions which form continuous flow paths running in parallel to the central axis of the spiral. Preferably, an intermediate band is provided between the coils of the band said intermediate band being wound up into the spiral together with the band. The flow paths thus run between the undulating band and the intermediate band. Preferably, the intermediate band is formed to be flat. In particular, the intermediate band does not have an undulating course. Preferably, the band and the intermediate band are laid over each other and are wound up together into the spiral. Advantageously the coils of the intermediate band lie between the coils of the undulating band. The spiral is preferably held together by a clamp, a retaining ring or a bracket. The band and/or the intermediate band preferably consist of metal, in particular of sheet metal.

The flow straightener referred to above has a clearly lower flow resistance in comparison to conventional flow straighteners. In particular, the flow straightener can also be provided separately from the device according to the invention and/or can form the subject matter of this or a separate application. For this purpose, for example, a measurement arrangement for a fluid is provided, which comprises a fluid line, a or the flow straightener connected to the fluid line and a sensor connected to the fluid line, which is provided at a distance to the flow straightener and preferably forms a flow sensor. This flow straightener can be developed according to all described embodiments. Furthermore, the measurement arrangement can be formed by the device according to the invention or can comprise this. For example, the sensor connected to the fluid line is formed by the differential pressure sensor or by the other sensor of the device according to the invention, such that the flow straightener is connected to the device according to the invention, in particular by interposing the fluid line.

According to one embodiment of the invention, an evaluation unit is provided, to which in particular the differential pressure sensor is connected, preferably electrically. Advantageously, the other sensor is also connected to the evaluation unit, in particular electrically. Preferably, the additional sensor is furthermore connected to the evaluation unit, in particular electrically. Preferably, the drive of the actuating device is also connected to the evaluation unit, in particular electrically. The evaluation unit can be arranged to be assembled on or in the housing or separately, in particular remotely, from this.

Preferably, signals delivered by the differential pressure sensor are able to be evaluated by means of the evaluation unit. Advantageously, signals delivered by the other sensor and/or by the additional sensor are also able to be evaluated by means of the evaluation unit. In particular, the evaluation unit comprises or forms a control unit, such that the evaluation unit can also be referred to as an evaluation and/or control unit. Preferably, the drive of the actuating device is able to be controlled for the rotation of the shut-off body by means of the evaluation unit. The evaluation unit preferably comprises a computer, in particular a digital computer.

According to one development of the invention, a volume flow, in particular a standard volume flow, of the fluid is able to be determined by means of the evaluation device. This volume or standard volume flow is preferably recorded in a predetermined time interval such that a fluid volume or fluid standard volume which has flowed through the openings during the time interval is able to be calculated from the volume or standard volume flow. The volume or standard volume flow is, for example, able to be determined based on the signals delivered by the differential pressure sensor. Additionally, this determination can occur based on the signals delivered by the other sensor and/or by the additional sensor. Furthermore, the volume or standard volume flow can be determined based on the signals delivered by the other sensor, if this is formed as a flow sensor, such as, for example, a thermal or calorimetric flow sensor. Thus the volume or standard volume flow can be determined by two different measurement methods, such that a verification of the determined volume or standard volume flow is possible by means of the evaluation unit. Preferably it is possible by means of the evaluation unit to verify a volume or standard volume flow detected by means of the thermal or calorimetric flow sensor using a volume or standard volume flow determined by means of the differential pressure sensor. Furthermore it is possible, by means of the evaluation unit, to verify a volume or standard volume flow determined by means of the differential pressure sensor using a volume or standard volume flow determined by means of the thermal or calorimetric flow measurement sensor.

Furthermore, the invention relates to a method to control a compressed air system which has a motor, a compressed air compressor driven by the motor and a compressed air supply line connected to the compressed air compressor. The compressed air supply line is supplied with compressed air by the compressed air compressor, wherein:
  an energy quantity supplied to the motor is determined in a predetermined time interval,
  a primary energy quantity used in the predetermined time interval is determined by multiplication of the energy quantity supplied to the motor by a primary energy factor,
  a compressed air energy quantity emitted by the compressor in the predetermined time interval is determined,
  an actual compressed air efficiency is determined by division of the compressed air energy quantity by the primary energy quantity,
  a compressed air efficiency value is determined by division of the actual compressed air efficiency values by a predetermined target compressed air efficiency value,
  the connection between the compressed air compressor and the compressed air supply line is blocked if the compressed air efficiency value is below a predetermined compressed air efficiency limit value. In particular, in this case, the motor is also switched off. Preferably, the rotational speed of the motor is regulated or controlled depending on the compressed air efficiency value, in particular in such a way that this is increased or maximised.

It can be ensured by the method according to the invention that the compressed air system is operated only at sufficient compressed air efficiency, in particular by considering the used primary energy. The compressed air supply to the compressed air supply line can be ensured, for example, by at least one other compressed air compressor, in the case that the connection between the compressed air compressor and the compressed air supply line is blocked.

The actual compressed air efficiency is preferably a standardised actual compressed air efficiency. Furthermore the target compressed air efficiency is a standardised target compressed air efficiency.

According to one development of the method the compressed air system comprises a device according to the invention. The compressed air compressor is connected to the compressed air supply line by interposing the device according to the invention. Preferably, the method is implemented with the evaluation unit of the device according to the invention. The method can also, however, be implemented independently of the device according to the invention and/or can form the subject matter of this or a separate application.

The primary energy factor describes the primary energy, which was or is required for the provision of energy (final energy) supplied to the motor, for example in the form of flammable gas for a gas motor or in the form of electrical current for an electromotor. In particular, the primary energy factor is provided. As the primary energy is composed, as a rule, of several portions which are gained in different ways, the primary energy factor can change over time, if at least one of the portions decreases or increases, for example due to a lower portion of natural gas (primary energy) and due to a thus higher portion of biogas (secondary energy), which is gained from biomasses (primary energy). Furthermore the primary energy factor can be different from country to country. The primary energy in particular results from the multiplication of the final energy by the primary energy factor.

The motor is, for example, a gas motor, to which energy is supplied in the form of flammable gas. In this case, the energy quantity supplied to the motor is determined, in particular, with a gas meter, which is connected in a gas supply line connected to the motor.

The motor can, however, also be an electromotor, to which energy is supplied in the form of an electrical current. In this case, the energy quantity supplied to the motor is determined, in particular, with an electricity meter, which is connected in a current supply line connected to the motor.

The compressed air energy quantity emitted by the compressor is determined in particular by measurement of at least one or more physical properties of the air pressure. To determine one of the at least one or more physical properties, in particular, a flow measurement is implemented in or at the compressed air supplied to the compressed air supply line by the compressed air compressor, preferably with the device according to the invention. Preferably, furthermore, the temperature and/or the pressure of the compressed air are measured as physical properties. The flow measurement in particular supplies a standard volume flow of the fluid in standard cubic meters per hour. A compressed air power results by multiplication of the standard volume flow by a specific compressed air identification number. The compressed air energy quantity emitted by the compressor in the predetermined time interval is determined from the compressed air power. This can occur, in the simplest case, by multiplication of the compressed air power by the duration of the time interval. As the compressed air line can change in the predetermined time interval, the compressed air energy quantity is, however, preferably determined by integration, in particular by numerical integration, of the compressed air power over the time interval.

According to one development of the method, the compressed air system has a shut-off organ connected between the compressed air compressor and the compressed air supply line. The shut-off organ may be, for example, in the form of a shut-off valve, by means of which the connection between the compressed air compressor and the compressed air supply line is blocked if the compressed air efficiency value is below the predetermined compressed air efficiency. Preferably, the shut-off organ is formed by the device according to the invention. In the device, in particular, one of the coaxial openings is connected to the compressed air compressor and the other of the coaxial openings is connected to the compressed air supply line. Preferably, therein the connection of the second measuring inlet to the interior is provided between the compressed air compressor and the shut-off body and/or the measuring nozzle. If the compressed air efficiency value is below the predetermined compressed air efficiency limit value, preferably the shut-off body of the device according to the invention is transferred into the second rotational angle position. Hereby, the connection between the compressed air compressor and the compressed air supply line is blocked.

According to one development of the method, the compressed air system has a heating circuit which is thermally coupled to the motor, to which heating circuit exhaust heat of the motor is supplied, wherein:
a heat quantity emitted by the heating circuit in the predetermined time interval is determined,
an actual heat efficiency is determined by division of the heat quantity by the primary energy quantity,
a heat efficiency value is determined by division of the actual heat efficiency by a predetermined target heat efficiency,
the connection between the compressed air compressor and the compressed air supply line is blocked, if the heat efficiency value is below a predetermined heat efficiency limit value. In particular, the motor is also switched off in this case. Preferably, the rotational speed of the motor is regulated or controlled depending on the heat efficiency vale, in particular in such a way that this is increased or maximised.

Due to this development it is ensured that the compressed air system is operated only at a sufficient heat efficiency, in particular considering the used primary energy. The heat supply to the heating circuit can be ensured, for example by at least one other heating system, in the case that the connection between the compressed air compressor and the compressed air supply line is blocked.

Preferably, the compressed air compressor is also thermally coupled to the heating circuit, to which additionally exhaust heat of the compressed air compressor is supplied. If the motor is a gas motor, preferably, the exhaust gas line of the gas motor is also thermally coupled to the heating circuit.

The actual heat efficiency is preferably a standardised actual heat efficiency. Furthermore, the target heat efficiency is preferably a standardised target heat efficiency.

The connection between the compressed air compressor and the compressed air supply line is blocked, for example by means of the shut-off organ, if the heat efficiency value is below the predetermined heat efficiency limit value. Preferably, the shut-off body of the device according to the invention is transferred into the second rotational angle position if the heat efficiency value is below the predetermined heat efficiency limit value. Hereby the connection between the compressed air compressor and the compressed air supply line is blocked.

The heat quantity emitted by the heating circuit is, in particular, measured by temperature measurements in or at a heat transfer fluid, which circulates in the heating circuit. Advantageously, at least one heat consumer is connected in the heating circuit or is thermally coupled to this. For example, a value for the emitted heat quantity can be determined by measuring the temperatures of the heat transfer fluid before and after the at least one heat consumer.

According to one development of the invention, the primary energy quantity saved in comparison to a conventional compressed air system is determined during a predetermined time duration. The saved primary energy quantity is multiplied by a carbon dioxide emission factor, from which results a carbon dioxide quantity saved compared to the conventional compressed air system. The predetermined time duration can be identical to the predetermined time interval or can deviate from this.

The saved primary energy quantity is preferably determined in that the difference of the, in particular standardised, actual compressed air efficiency and a reference efficiency is formed. This difference is multiplied by the primary energy quantity used during the predetermined time duration, from which results the saved primary energy quantity. The primary energy quantity used during the predetermined time duration is determined in particular in that the energy quantity supplied to the motor is determined during the time duration and is multiplied by the primary energy factor.

Preferably, the, in particular standardised, compressed air efficiency of the conventional compressed air system is determined as a reference efficiency, and preferably before the determination of the saved primary energy quantity and/or the saved carbon dioxide quantity. It is, however, also possible that the reference efficiency is formed by the, in particular standardised, target compressed air efficiency.

According to one development of the method, a value characterising the leakage of the compressed air system (leakage value) is determined during the duration of a base load state of the compressed air system. For this purpose, flow measurements are implemented during this duration and the leakage value is determined by evaluation of these flow measurements.

BRIEF DESCRIPTION OF DRAWINGS

The invention is described below by means of a preferred embodiment, with reference to the drawing. In the drawing are shown.

DETAILED DESCRIPTION

Figure 1:
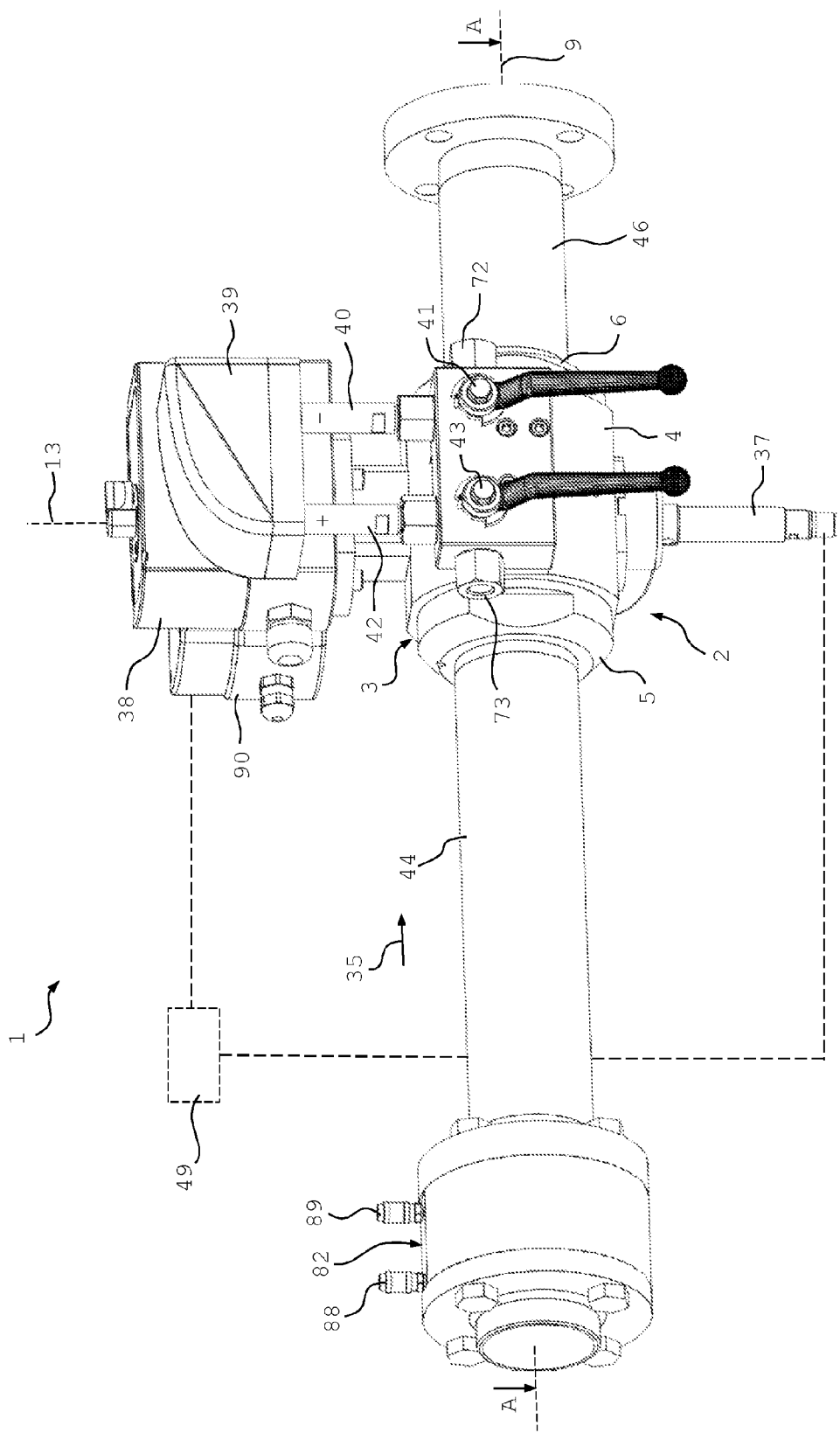
FIG. 1 a perspective view of a device according to one embodiment of the invention, FIG. 2 a longitudinal cut through the device along the intersecting line A-A evident from FIG. 1, in a perspective depiction, FIG. 3 a side view of the shut-off valve evident from FIG. 1, wherein several attachments were omitted, FIG. 4 a cut through the shut-off valve along the intersecting line B-B evident from FIG. 3
Figure 2:
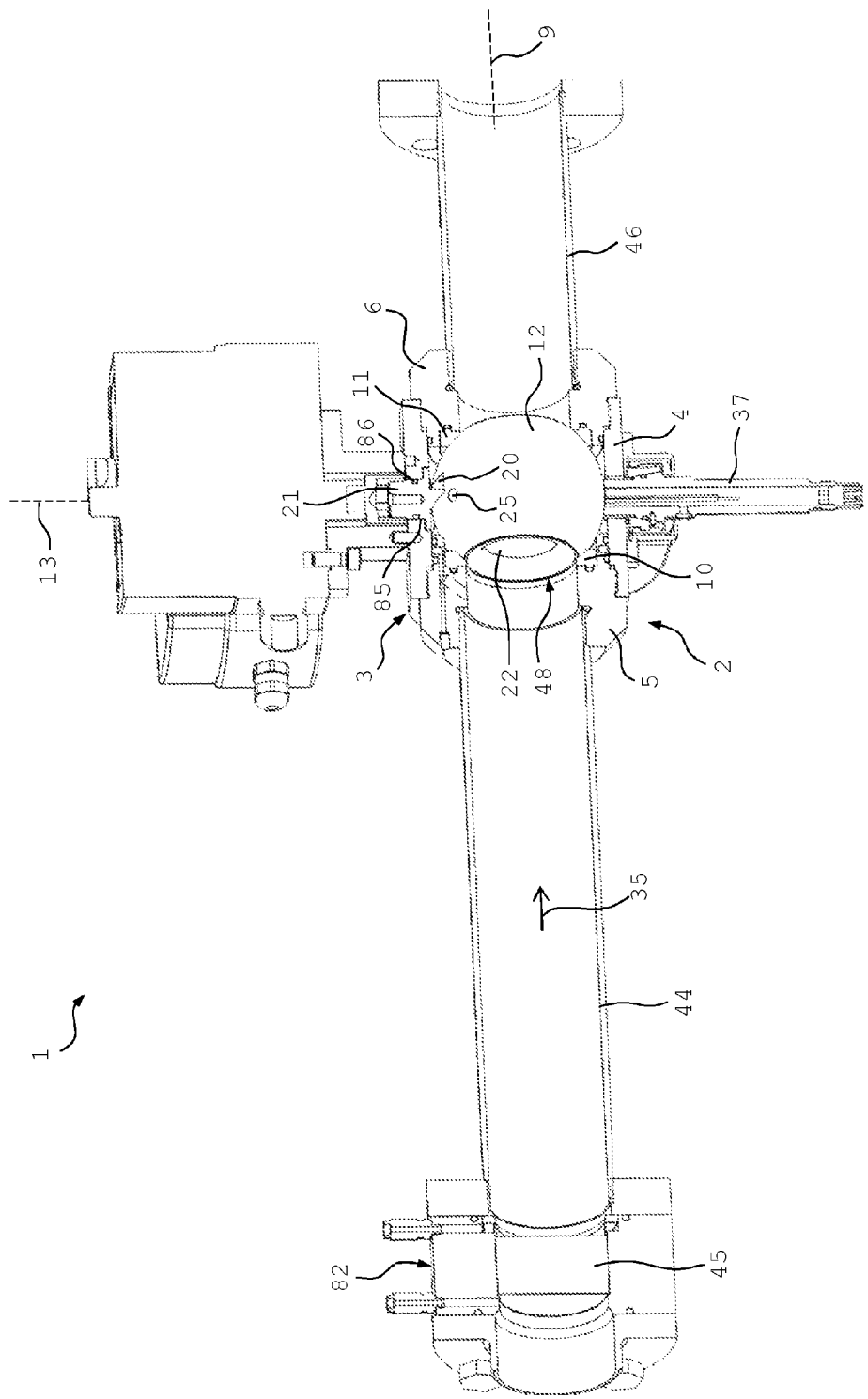
Figure 3:
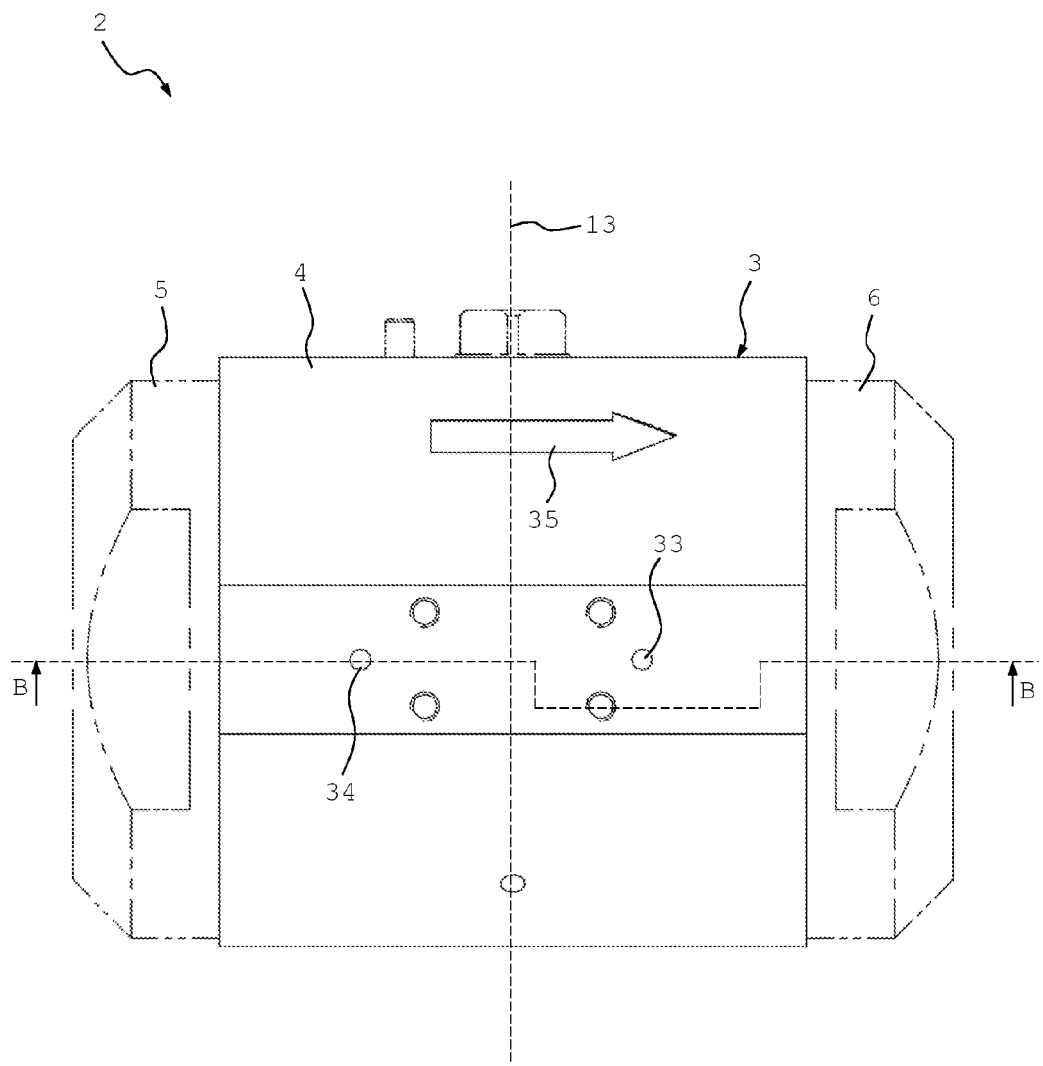
Figure 4:
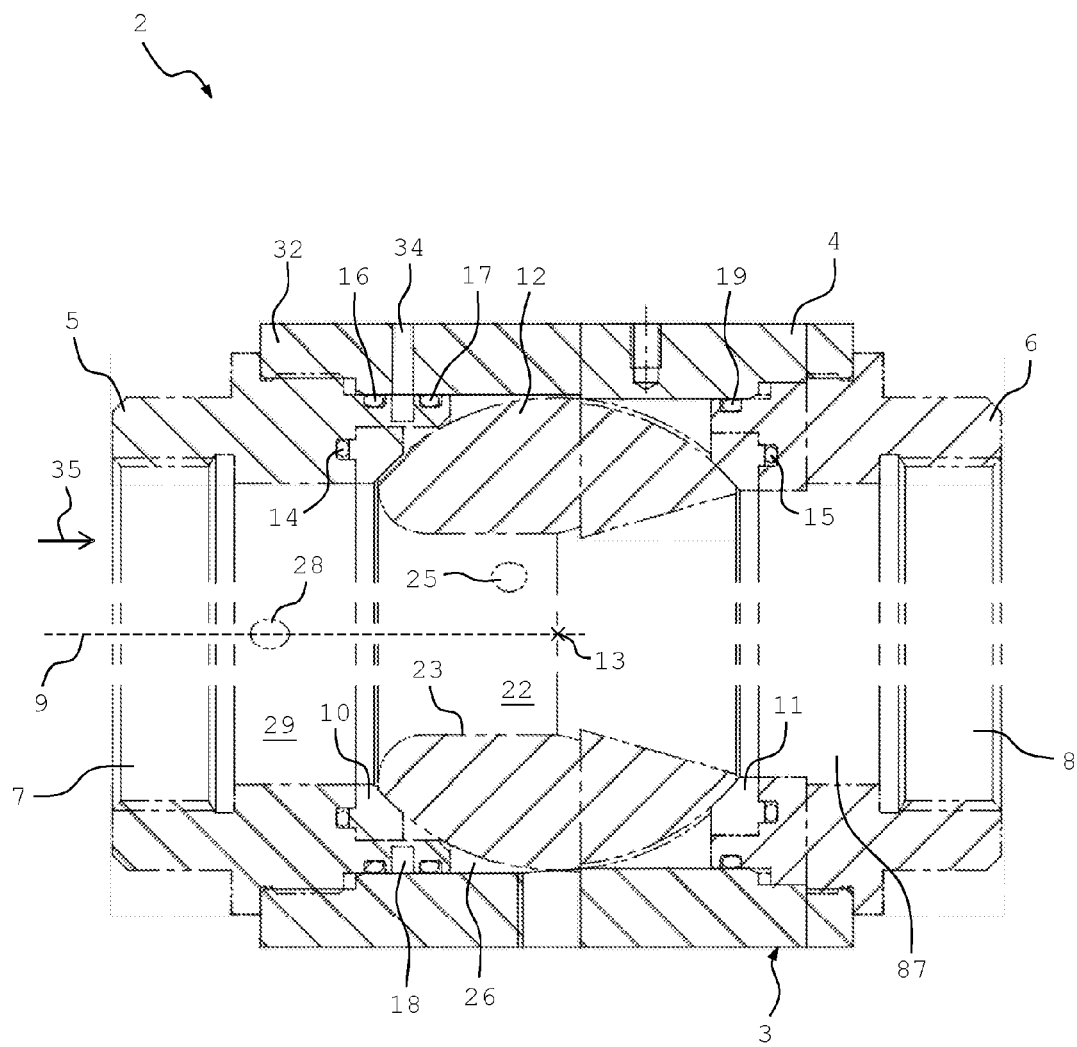
Figure 5:
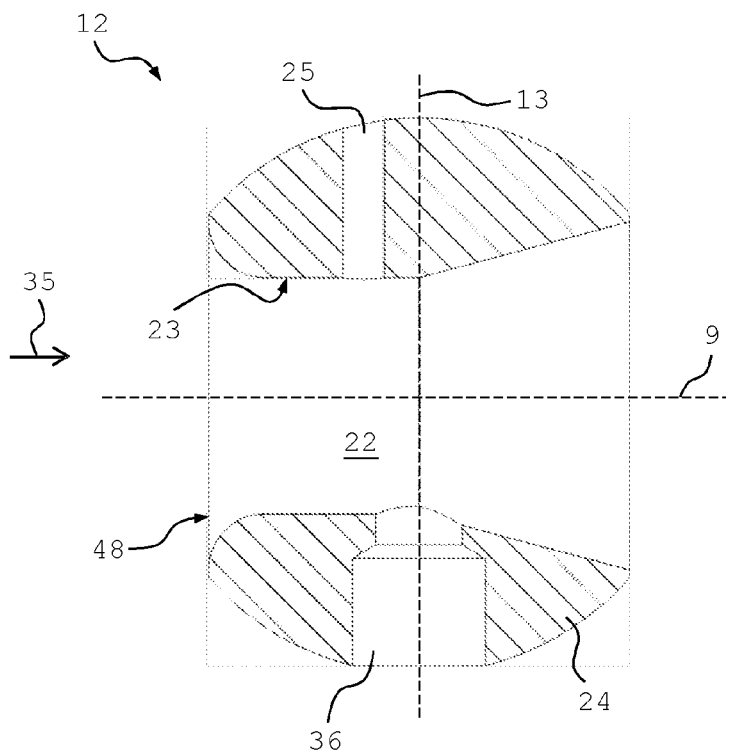
FIG. 5 a longitudinal cut through the shut-off body of the shut-off valve.
Figure 6:
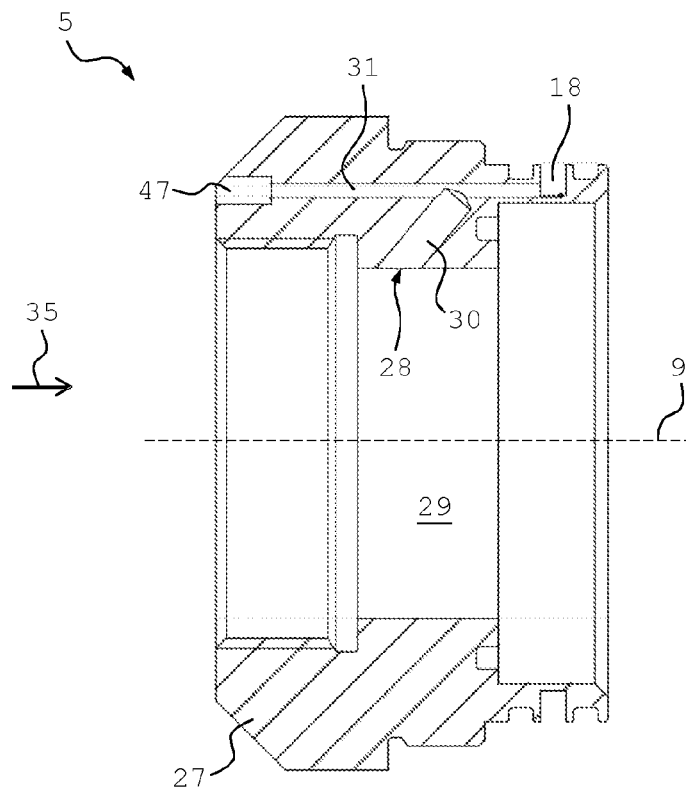
FIG. 6 a longitudinal cut through a circlip of the shut-off valve.

Different views and partial views of a device 1 according to one embodiment of the invention are evident from FIGS. 1 to 6. The device 1 comprises a shut-off valve 2 having a housing 3 which has a first housing part 4, a second housing part 5 and a third housing part 6. The second and the third housing parts 5 and 6 are each formed as a circlip and are screwed into the first housing part. The housing 3 is provided with two coaxial openings 7 and 8, wherein the circlip 5 comprises the housing opening 7 and the circlip 6 comprises the housing opening 8. An axial direction of the housing 3 is characterised with the reference numeral 9, which also simultaneously forms the axis of the openings 7 and 8. The circlips 5 and 6 are screwed into the first housing part 4 in the axial direction 9 on different sides. In the first housing part 4, two slide rings 10 and 11 are arranged at an axial distance to one another. Between the slide rings 10 and 11 sits a shut-off ball 12. The shut-off ball 12 is arranged in the first housing part 4, which is mounted on the slide rings 10 and to rotate around a rotational axis 13 that runs perpendicularly to the axial direction 9. The circlips 5 and 6 therein secure the slide rings 10 and 11 and thus also the shut-off ball 12 in the first housing part 4.

A sealing ring 14 or 15 is arranged between the slide ring 10 and the circlip 5 as well as between the slide ring 11 and the circlip 6 respectively. Two sealing rings 16 and 17 are arranged between the circlip 5 and the first housing part 4, wherein an annular space 18 is provided between the sealing rings 16 and 17 in the axial direction 9. The annular space 18 is enclosed between the circlip 5 and the first housing part 4. The annular space 18 is introduced into the outer peripheral surface of the circlip as an annular groove. A sealing ring 19 is arranged between the circlip 6 and the first housing part 4.

An engaging recess 20 is introduced into the shut-off ball 12 with which an actuating element 21 engages, by means of which the shut-off ball 12 is able to rotate around the rotational axis 13. The actuating element 21 therein extends through an actuating recess 85 provided in the wall 32 of the first housing part 4 and is sealed by a sealing ring 86 with respect to the first housing part 4. Furthermore, the actuating element 21 is connected to the shut-off ball 12 to be torsionally rigid with regard to the rotational axis 13.

A flow passage 87 comprising the openings 7 and 8, as well as the interior 29, runs through the housing 3 in the axial direction 9. The shut-off ball 12 is arranged in the flow passage 87. Furthermore, a flow channel 22 extends through the shut-off ball 12 transversely to the rotational axis 13. The flow channel 22 is provided with a local cross-sectional constriction 23. In the open position of the shut-off ball 12, evident from FIGS. 2 and 4 (first rotational angle position), the flow channel 22 is connected in the flow passage 87 and thus is connected to the two openings 7 and 8. The flow channel 22 therein runs in the axial direction 9 and forms a part of the flow passage 87 such that a fluid can flow between the openings 7 and 8 though the flow passage 87. In the first rotational angle position, the shut-off valve 2 is thus opened. If the shut-off ball 12, and thus also the flow channel 22, is rotated by 90° around the rotational axis 13 into a blocking position (second rotational angle position) by means of the actuating element 21; the shut-off ball 12 blocks the flow passage 87 with its wall 24. In this manner, a flow of the fluid through the flow passage 87 between the two openings 7 and 8 is prevented. The flow channel 22 now runs transversely to the axial direction 9. In the second rotational angle position, the shut-off valve 2 is thus closed or blocked.

A pressure tapping hole 25 is provided in the wall 24 of the shut-off ball 12 in the region of the cross-sectional constriction 23. A clearance 26 (FIG. 4) provided between the shut-off ball 12 and the first housing part 4, and is connected to the flow channel 22 in the open position of the shut-off ball 12. The clearance 26 is formed in a rotary manner and is limited in the axial direction by the circlips 5 and 6 as well as by the slide rings 10 and 11. Furthermore, a pressure tapping hole 28 is provided in the wall 27 of the circlip 5, which connects an interior 29 of the circlip 5 to the annular space 18. For production reasons, the pressure tapping hole 28 is formed by two bores 30 and 31 which merge into each other. The bore 30 therein extends from the interior 29 to the bore 31 and in particular runs at an angle to the axial direction 9. The bore 31 connects the bore 30 to the annular space 18 and in particular runs in the axial direction 9. For production reasons, the bore 31 is introduced into the wall 27 through a front side of the circlip 5 and subsequently is locked to this front side in a sealed manner by a lock 47.

Two measurement openings 33 and 34 are provided in the wall 32 of the first housing part 4. The measurement opening 33 discharges into the clearance 26 and the measurement opening 34 discharges into the annular space 18. Thus the flow channel 22 is accessible through the measurement opening 33, whereas the interior 29 is accessible through the measurement opening 34. As the shut-off ball 12 forms a choke or nozzle 48 having a cross-sectional constriction, in particular a Venturi nozzle, a flow measurement is able to be implemented with regard to the flowing fluid. A differential pressure sensor 39 is connected to the measurement openings 33 and 34. The flow direction of the fluid, the flow of which is to be measured, is therein marked with the arrow 35. The fluid is, in particular, compressed air.

Furthermore, a sensor receiving hole 36 is provided in the wall 24 of the shut-off ball, through which a calorimetric flow measurement sensor 37 is extended into the flow channel 22. The sensor receiving hole 36 extends along the rotational axis 13 such that the flow sensor 37 does not have to be remote if the shut-off ball 12 is rotated. Therein the sensor receiving hole 36 is arranged diametrically opposite the actuating element 21, such that an actuation of the shut-off ball 12 is not prevented by the flow sensor 37.

An electric drive 38 connected to the actuating element 21 and the differential pressure sensor 39 are fixed on the outside to the first housing part 4. The differential pressure sensor 39 is connected to a first measuring inlet 40 by interposing a shut-off valve 41 with the measurement opening 33 and to a second measuring inlet 42 by interposing a shut-off valve 43 with the measurement opening 34. Therein, the first measuring inlet 40 is referred to in particular as a plus connection and the second measuring inlet 42 in particular as a minus connection of the differential pressure sensor 39. This is indicated in FIG. 1 by the corresponding symbols for plus and minus. The differential pressure sensor 39 is connected electrically to an evaluation and/or control unit 49, to which the flow sensor 37 and the drive 38 are connected electrically. Due to the drive 38, it is possible to rotate the shut-off ball automatically about the rotational axis 13. The evaluation and/or control unit 49 can be provided at a distance to the shut-off valve 2 and/or to the housing 3. Alternatively, the evaluation and/or control unit 49 can, however, also be provided in or on the housing 3, for example can be arranged in an extension housing 90 mounted on the housing 3.

The shut-off valves 41 and 43 can assume different switch positions. The first measuring inlet 40 is connected to the measurement opening 33 in an open switch position of the shut-off valve 41. The first measuring inlet 40 is separated from the measurement opening 33 in a blocked switch position of the shut-off valve 41. Furthermore the second measuring inlet 42 is connected to the measurement opening 34 in an open switch position of the shut-off valve 43, and the second measuring inlet 42 is separated from the measurement opening 34 in a blocked switch position of the shut-off valve 43.

In a test switch position of the shut-off valve 41, the first measuring inlet 40 is connected to a test connection 72, which is accessible from the outside, and is separated from the measurement opening 33. Furthermore, in a test switch position of the shut-off valve 43, the second measuring inlet 42 is connected to a test connection 73 (FIG. 1). The test connection 73 is accessible from the outside and is separated from the measurement opening 34. The differential pressure sensor 39 can thus be loaded via the test connections 72 and 73 with a defined test pressure or with a defined test pressure difference, in order to check the functionality of the differential pressure sensor 39.

Preferably, it is additionally possible to separate the measuring inlets 40 and 42 from the measurement openings 33 and 34 in a pressure equalisation position of the two shut-off valves 41 and 43 and to connect them to each other. Thus a pressure equalisation between the two measuring inlets 40 and 42 is possible.

A flow straightener 45 is connected to the circlip 5 by interposing a fluid line 44 serving as an inlet pipe, such that the inlet pipe, and thus the fluid line 44, is able to be formed to be relatively short. In particular the flow straightener 45 smooths the flow of the fluid. Furthermore, a fluid line 46 is connected to the circlip 6. The fluid line 46 serves as an outlet pipe or as a connection for a fluid line serving as an outlet pipe. The flow straightener 45 is arranged in a housing 82 which is evident from FIG. 1. Two test connections 88 and 89 are provided on the housing 82. The test connections 88 and 89 enable a differential pressure sensor to be connected thereto, by means of which the difference of the pressures of the flowing fluid can be measured before and after the flow straightener 45. Thus, a contamination of the flow straightener 45 is able to be detected.

Figure 7:
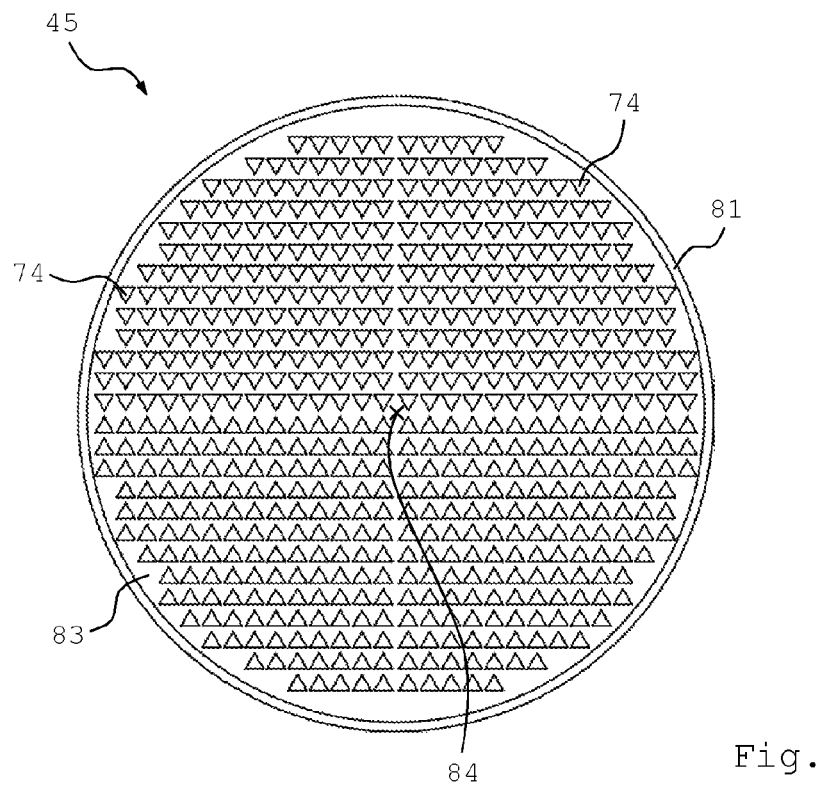
FIG. 7 a view of the flow straightener evident from FIG. 2.

A schematic top view onto the flow straightener 45 in the axial direction 9 is evident from FIG. 7. The flow straightener 45 comprises several continuous flow paths 74 which extend in the axial direction 9. The flow straightener consists of a metallic band 75 which is formed in an undulating manner in the direction of its longitudinal extension 76 and is wound into a spiral 83. Due to the undulation, the band 75 is provided alternately with elevations 77 and depressions 78 which form continuous flow paths 74 running in parallel to the central axis 84 of the spiral 83. The central axis 84 of the spiral 83 therein runs in the axial direction 9. A metallic intermediate band 79 is provided between the coils of the band 75. The metallic intermediate band 79 is wound into the spiral 83 together with the band 75. The flow paths 74 thus run between the undulating band 75 and the intermediate band 79. The intermediate band 79 has no undulating course and is formed, in particular, to be flat.

Figure 8:
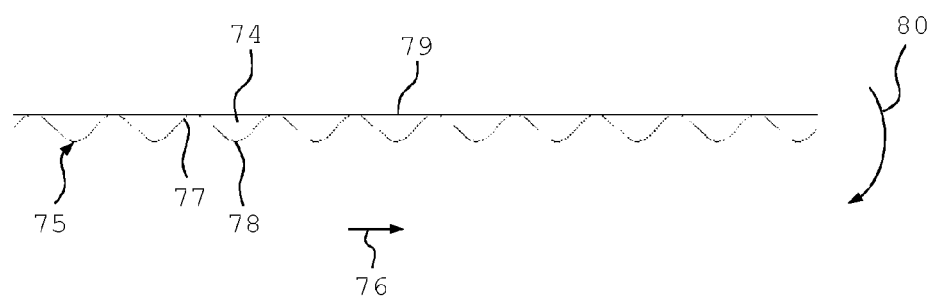
FIG. 8 a view of the flow straightener in the unwound state.

A part of a winding of the spiral 83 is shown in a schematic depiction in FIG. 8. The band 75 and the intermediate band 79 are laid over one another to produce the flow straightener 45, and are wound together into the spiral 83, which is specified in FIG. 8 by the arrow 80. The coils of the intermediate band 79 lie between the coils of the undulating band 75 after the winding. The spiral 83 is held together preferably by a retaining ring 81.

Figure 9:
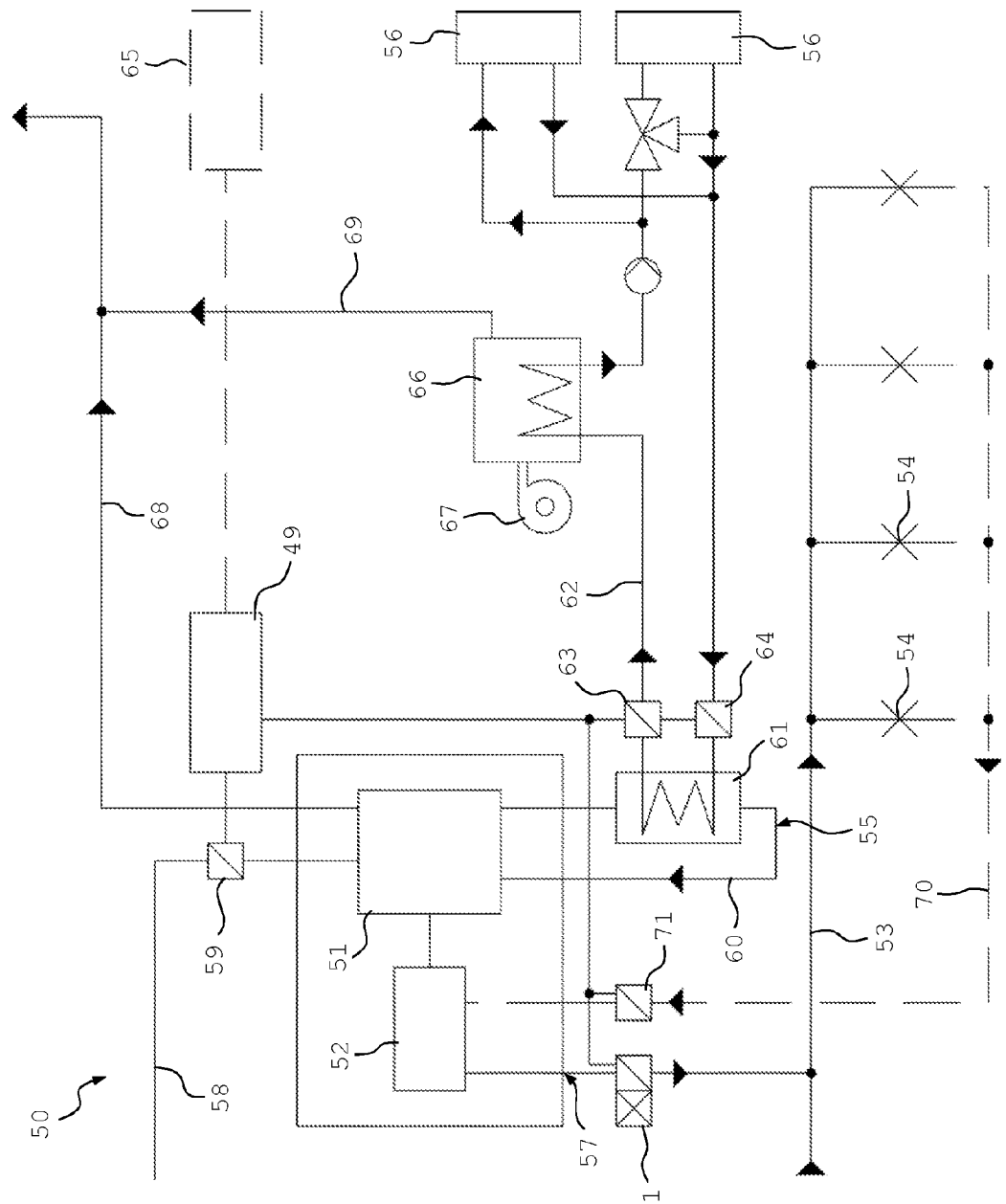
FIG. 9 a schematic view of a compressed air system having a device according to FIG. 1.

A schematic view of a compressed air system 50 is evident from FIG. 9. The compressed air system 50 has a gas motor 51, a compressed air compressor 52 driven by the gas motor 51, in particular directly or by interposing a gear, a compressed air supply line 53 having compressed air consumers 54, and a heating circuit arrangement 55 having heat consumers 56. The compressed air supply line 53 is connected to the compressed air outlet 57 of the compressed air compressor 52 by interposing the device 1 according to the invention. Therein the device 1 is connected to the compressed air outlet 57 with the flow straightener 45 and to the compressed air supply line 53 with the fluid line 46. The gas motor 51 is supplied with combustible gas via a gas line 58. In the gas line 58, a gas meter 59 is connected electrically to the evaluation and control unit 49. In this manner the gas quantity (for example gas volume) supplied to the gas motor 51 is able to be determined. The evaluation and control unit 49 can therein be provided locally separated from the shut-off valve 2 of the device 1. The exhaust gas line of the gas motor 51 is marked with the reference numeral 68.

The heating circuit arrangement 55 comprises a first heating circuit 60 coupled thermally to the gas motor 51 and preferably also to the exhaust gas line 68 and/or to the compressor 52. First heating circuit 60 includes a heat exchanger 61, and a first heat transfer fluid circulates in the first heating circuit 60. The first heating circuit 60 is coupled thermally to a second heating circuit 62 via the heat exchanger 61. The heat consumers 56 are connected to the second heating circuit 62. A second heat transfer fluid circulates in the second heating circuit 62. The first heat transfer fluid is heated by the exhaust heat of the gas motor 51 and emits heat to the second heat transfer fluid via the heat exchanger 61, by means of which heat is able to be supplied to the heat consumers 56. Furthermore, two temperature sensors 63 and 64 that are connected electrically to the evaluation and control unit 49 are provided, by means of which the temperatures of the second heat transfer fluid are able to be measured when flowing out of and flowing into the heat exchanger 61.

The evaluation and control unit 49 determines the actual value of the efficiency of the compressed air system (actual compressed air efficiency) as an average value, based on the signals supplied by the gas meter 59 and the signals supplied by the differential pressure sensor 39 and/or by the calorimetric flow sensor. By division of the actual compressed air value by a primary energy factor, preferably a standardised actual compressed air efficiency is formed by means of the evaluation and control unit 49. The primary energy factor is, in particular for a form of the final energy supplied to the compressor 52, here gas, and provided for a country or a region. The primary energy factor can change over time.

By means of the evaluation and control unit 49, the, in particular standardised, actual compressed air efficiency is divided by a provided, in particular standardised, target compressed air efficiency, whereby a compressed air efficiency results.

If the value of the compressed air efficiency is below a first compressed air efficiency limit value, but above a second compressed air efficiency limit value, then a first warning signal is emitted by means of the evaluation and control unit 49, which is, for example an optical warning signal in the colour yellow.

If, however, the value of the differential efficiency is below both compressed air efficiency limit values, then a second warning signal is emitted by means of the evaluation and control unit 49. The second warning signal may be, for example, an optical warning signal in the colour red. Furthermore, by means of the evaluation and control unit 49, the drive 38 is controlled in such a way that the shut-off ball 12 blocks the flow through the openings 7 and 8. Thus the compressed air supply line 53 is separated from the compressed air compressor 52. Additionally, a ready signal is emitted to a higher-level control 65 by means of the evaluation and control unit 49, which signals the non-operational state of the compressed air system 1. In particular, the gas motor 51 is also switched off, which, for example, can occur by means of the evaluation and control unit 49 or by means of the higher-level control 65.

Furthermore, the exhaust heat of the compressed air system actually used in a predetermined time interval, in particular by the heat consumers 56, is determined by means of the evaluation and control unit 49. This determination is based on the signals supplied by the temperature sensors 63 and 64, and is divided by the primary energy quantity used in this time interval. The result is then averaged over a predetermined time interval. From this results the, in particular standardised, actual heat efficiency, which is divided by a predetermined, in particular standardised, target heat efficiency by means of the evaluation and control unit 49. The result is averaged over a predetermined time period by means of the evaluation and control unit 49, from which the, in particular standardised, heat efficiency results. The primary energy quantity referred to above can be determined, for example, by multiplication of the primary energy factor by the energy quantity (in the form of gas) supplied to the gas motor 51 in the allocated time interval, said energy quantity being able to be detected by means of the gas meter 59.

If the value of the heat efficiency is below a first heat efficiency limit value, but above a second heat efficiency limit value, then the first warning signal is emitted by means of the evaluation and control unit 49.

If, however, the value of the heat efficiency is below both heat efficiency limit values, then the second warning signal is emitted by means of the evaluation and control unit 49. Furthermore, the drive 38 is controlled by means of the evaluation and control unit 49 in such a way that the shut-off ball 12 blocks the flow through the openings 7 and 8. Thus the compressed air supply line 53 is separated from the compressed air compressor 52. Additionally, the ready signal signalling the non-operational state of the compressed air system 1 is emitted to the higher-level control 65 by means of the evaluation and control unit 49. In particular, the gas motor 51 is also switched off, which can occur, for example, by means of the evaluation and control unit 49 or by means of the higher-level control 65.

Additionally, a heat exchanger 66 can be connected in the second heating circuit 62, which is coupled to a burner 67, which is, in particular, a gas burner. In the case of a large requirement for heat, thus the burner 67 can be switched on and the second heat transfer fluid can additionally be heated. The exhaust gas line of the burner is marked with the reference numeral 69 and can be thermally coupled to the first or to the second heating circuit.

Furthermore, additionally, a compressed air recirculation 70 can be provided, by means of which compressed air emitted by the compressed air consumers 54 is able to be supplied again to the compressed air compressor 52. A flow sensor 71 is connected in the compressed air recirculation 70. The flow sensor 71 is connected to the evaluation and control unit 49. The compressed air efficiency can be increased by the compressed air recirculation 70.

Additionally, it is possible by means of the evaluation and control unit 49 to determine saved carbon dioxide emissions ($CO_2$ emissions) after converting a conventional compressed air system into a compressed air system 1 according to FIG. 9. For this purpose, before the conversion, the efficiency of the conventional compressed air system is determined as a reference efficiency, in particular as a standardised reference efficiency. After the conversion of the compressed air system, the difference of the, in particular standardised, actual compressed air efficiency and the, in particular standardised, reference efficiency is determined by means of the evaluation and control unit 49 in a predetermined time interval. This difference is then multiplied by the primary energy quantity supplied to the motor in this time interval. The result supplies the primary energy quantity saved in the time interval. The saved primary energy can now be multiplied by a predetermined $CO_2$ emissions factor by means of the evaluation and control unit 49. This results in the saved $CO_2$ emissions in the predetermined time interval.

Additionally, it is possible by means of the evaluation and control unit 49 to determine a value characterising the leakage of the compressed air system 1 (leakage value). If a basic load state of the compressed air system is provided for the duration of a predetermined time interval, the leakage value can be determined by means of the evaluation and control unit 49 by evaluation of flow measurements implemented during this duration.

According to a variation of the compressed air system 50, the gas motor 51 is replaced by an electromotor and the gas meter 59 by a current meter.

LIST OF REFERENCE NUMERALS

1 Device for measuring differential pressure
2 Shut-off valve
3 Housing
4 First housing part
5 Second housing part/circlip
6 Third housing part/circlip
7 Housing opening
8 Housing opening
9 Axial direction
10 Slide ring
11 Slide ring
12 Shut-off ball
13 Rotational axis
14 Sealing ring
15 Sealing ring 16 Sealing ring
17 Sealing ring
18 Annular space
19 Sealing ring
20 Engagement recess in shut-off ball
21 Actuating element
22 Flow channel
23 Cross-sectional constriction of the flow channel
24 Wall of the shut-off ball
25 Pressure tapping hole in shut-off ball
26 Clearance
27 Wall of the second housing part
28 Pressure tapping hole in the second housing part
29 Interior
30 Bore
31 Bore
32 Wall of the first housing part
33 Measurement opening
34 Measurement opening
35 Flow direction of the fluid
36 Sensor receiving hole in shut-off ball
37 calorimetric flow sensor
38 Drive
39 Differential pressure sensor
40 first measuring inlet
41 Shut-off valve
42 Second measuring inlet
43 Shut-off valve
44 Fluid line
45 Flow straightener
46 Fluid line
47 Lock
48 Nozzle/choke
49 Evaluation and/or control unit
50 Compressed air system
51 Gas motor
52 Compressed air compressor
53 Compressed air supply line
54 Compressed air consumer
55 Heating circuit arrangement
56 Heat consumer
57 Compressed air outlet of the compressed air compressor
58 Gas line
59 Gas meter
60 First heating circuit
61 Heat exchanger
62 Second heating circuit
63 Temperature sensor
64 Temperature sensor
65 Higher-level control
66 Heat exchanger
67 Burner
68 Exhaust gas line of the compressor
69 Exhaust gas line of the burner
70 Compressed air recirculation
71 Flow sensor
72 Test connection
73 Test connection
74 Flow path of the flow straightener
75 Undulating band of the flow straightener
76 Longitudinal extension of the undulating band
77 Elevation
78 Depression
79 Intermediate band of the flow straightener
80 Winding direction
81 Retaining ring of the flow straightener
82 Housing of the flow straightener
83 Spiral
84 Central axis of the spiral
85 Actuating recess in the first housing part
86 Sealing ring
87 Flow passage
88 Test connection
89 Test connection
90 Housing

The invention claimed is:

1. A device for measuring a differential pressure in a flowing fluid, comprising:
    a housing having two coaxial openings and an interior, the housing being accessible through at least one of the two coaxial openings;
    a measuring nozzle arranged in the housing and having a flow channel having a cross-sectional constriction;
    a differential pressure sensor having two measuring inlets, by means of which a difference between pressures at the two measuring inlets is able to be measured;
    wherein a first one of the two measuring inlets is connected to the flow channel and a second one of the two measuring inlets is connected to the interior, outside the measuring nozzle;
    a shut-off body comprising the measuring nozzle and mounted in the housing to rotate around a rotational axis, the shut-off body connecting the flow channel to the two coaxial openings in a first rotational angle position and blocking a flow between the two coaxial openings in a second rotational angle position; and
    a pressure tapping hole provided in a wall of the shut-off body for communicating with the flow channel, the pressure tapping hole being in communication with a clearance at least in the first rotational angle position, wherein the clearance is provided between the shut-off body and the housing, and to which said clearance the first measuring inlet is connected.

2. The device of claim 1, wherein the measuring nozzle comprises a Venturi nozzle.

3. The device of claim 1, wherein the shut-off body sits between two slide rings within the housing and is mounted on the two slide rings and is able to slide, and wherein the clearance is provided between the slide rings.

4. The device of claim 1, wherein the housing has a first housing part receiving the shut-off body and a second housing part securing the shut-off body in the first housing part, the second housing part having a wall and being arranged at least partially in the first housing part.

5. The device of claim 4, further comprising a pressure tapping hole formed in the wall of the second housing part, which discharges into the interior, the pressure tapping hole being connected to an annular space provided between the first housing part and the second housing part, to which said annular space the second measuring inlet is connected.

6. The device of claim 1, further comprising:
    a sensor receiving hole provided in a wall of the shut-off body that discharges into the flow channel; and
    a calorimetric flow sensor extending through the sensor receiving hole and into the flow channel.

7. The device of claim 1, further comprising a flow straightener connected to one of the coaxial openings by interposing a fluid line, wherein the fluid line serves as an inlet pipe, and wherein the second measuring inlet is connected to the interior between the one of the coaxial openings and the shut-off body.

8. The device of claim 1, further comprising a flow passage which includes the two coaxial openings and the interior, and which runs through the housing, and wherein the shut-off body is arranged in the flow passage, and wherein the flow channel is connected with the flow passage in the first rotational angle position, and wherein the flow channel runs transversely to the flow passage in the second rotational angle position such that the flow passage is blocked by a wall of the shut-off body in the second rotational angle position.

9. The device of claim 1, wherein the shut-off body forms a ball, and wherein the flow channel extends through the ball.

10. A method for measuring a differential pressure in a flowing fluid, the method comprising:

provideing a housing having two coaxial openings and an interior, said housing being accessible through at least one of the two coaxial openings;

providing a rotationally mounted shut-off body within the housing, the shut-off body having a measuring nozzle which includes a flow channel formed therein, the flow channel having a cross-sectional constriction;

providing a clearance within the interior of the housing between the interior and the shut-off body, the clearance being axially spaced apart from a rotational axis of the shut-off body and being in communication with the flow channel via a hole formed in the shut-off body, the hole extending in communication with the flow channel;

providing a differential pressure sensor having two measuring inlets, by means of which a difference between pressures at the two measuring inlets is able to be measured;

wherein a first of the two measuring inlets is connected to the flow channel via the clearance, and a second of the two measuring inlets is connected to the interior, outside the measuring nozzle;

using the shut-off body to connect the flow channel to the two coaxial openings when the shut-off body is positioned in a first rotational angle position; and using the shut-off body to block a flow between the two coaxial openings when the shut-off body is positioned in a second rotational angle position.

11. A device for measuring a differential pressure in a flowing fluid, comprising:

a housing having an interior;

a rotatable shut-off body arranged in the housing, the shut-off body having a portion forming a measuring nozzle and being arranged in the housing, the measuring nozzle having a flow channel having a cross-sectional constriction;

an actuating element for rotating the shut-off body between a first rotational angle position, wherein flow is blocked through the flow channel and therefore blocked through the housing, and a second rotational angle position wherein flow is permitted through the flow channel and therefore permitted through the housing;

a differential pressure sensor having two measuring inlets, by means of which a difference between pressures at the two measuring inlets is able to be measured;

wherein a first of the two measuring inlets is connected to the flow channel via a clearance within the housing which is formed axially spaced from a rotational axis of the shut-off body, and via a hole formed in the rotatable shut-off body, wherein the hole enables the first of the two measuring inlets to communicate with the flow channel via the clearance when the shut-off body is in the second rotational angle position; and wherein a second of the two measuring inlets is connected to the interior of the housing at a location axially spaced apart from the shut-off body, and independent of the shut-off body.

* * * * *